United States Patent
Torney et al.

(10) Patent No.: US 9,841,101 B2
(45) Date of Patent: Dec. 12, 2017

(54) CONTROL SYSTEM FOR HYDRAULICALLY POWERED AC GENERATOR

(71) Applicant: Cummins Power Generation IP, Inc., Minneapolis, MN (US)

(72) Inventors: Robert E. Torney, Minneapolis, MN (US); Nick V. Halstead, Oak Grove, MN (US); Hans L. Drabek, Saint Paul, MN (US); Eric G. Bollensen, Columbia Heights, MN (US); James C. Alexander, Saint Louis Park, MN (US); Tony Leakey, Robbinsdale, MN (US); Gerald R. Williams, Columbia Heights, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 311 days.

(21) Appl. No.: 14/477,539

(22) Filed: Sep. 4, 2014

(65) Prior Publication Data

US 2016/0072363 A1    Mar. 10, 2016

(51) Int. Cl.
*F02B 67/00*     (2006.01)
*F16H 61/46*     (2010.01)

(52) U.S. Cl.
CPC ............ *F16H 61/46* (2013.01); *F02B 67/00* (2013.01)

(58) Field of Classification Search
CPC ........... F02B 63/04; F02B 67/00; F16H 61/46
USPC ...... 290/43, 54, 1 A, 1 C, 7; 322/17, 29, 31, 322/44; 91/499; 123/461
See application file for complete search history.

(56) References Cited

U.S. PATENT DOCUMENTS

| | | | | |
|---|---|---|---|---|
| 4,057,960 A | * | 11/1977 | Werner | F02C 9/54 60/39.25 |
| 4,242,592 A | * | 12/1980 | Yannone | F02C 9/56 290/40 R |
| 4,427,896 A | * | 1/1984 | Waldron | G06K 13/0825 290/40 R |
| 4,490,619 A | | 12/1984 | McMinn | |
| 4,503,673 A | * | 3/1985 | Schachle | F03D 7/04 290/44 |
| 4,848,790 A | * | 7/1989 | Fukunaga | B60G 17/017 280/5.504 |
| 5,140,170 A | * | 8/1992 | Henderson | F03D 15/00 290/44 |
| 5,649,422 A | * | 7/1997 | Baginski | B66F 9/22 60/431 |

(Continued)

*Primary Examiner* — Julio C Gonzalez
(74) *Attorney, Agent, or Firm* — Foley & Lardner LLP (57) ABSTRACT

Systems and methods for use in controlling a hydraulically powered AC generator are provided. One control system includes a valve system. The valve system includes a fixed valve configured to provide a substantially constant flow rate of the fluid through the fixed valve to the hydraulically powered AC generator. The valve system further includes a variable valve configured to provide a variable flow rate of the fluid through the variable valve to the hydraulically powered AC generator. The control system further includes a sensor device configured to measure a speed of movement of a component of the hydraulically powered AC generator. The control system further includes a control circuit configured to control the variable flow rate of the variable valve based on the speed of movement of the component measured by the sensor device.

26 Claims, 7 Drawing Sheets

(56) References Cited

U.S. PATENT DOCUMENTS

| | | | | |
|---|---|---|---|---|
| 6,035,637 A * | 3/2000 | Beale | ............... | F02B 71/00 |
| | | | | 417/364 |
| 6,394,206 B1 * | 5/2002 | Fury | ............... | F04B 17/05 |
| | | | | 180/53.4 |
| 7,053,498 B1 | 5/2006 | Boisvert et al. | | |
| 7,459,800 B2 | 12/2008 | Boisvert et al. | | |
| 7,485,979 B1 | 2/2009 | Staalesen | | |
| 7,759,811 B2 | 7/2010 | Boisvert et al. | | |
| 8,269,359 B2 | 9/2012 | Boisvert et al. | | |
| 8,276,831 B2 | 10/2012 | Rutherford | | |
| 8,288,880 B2 | 10/2012 | Olsen et al. | | |
| 8,567,538 B2 | 10/2013 | Hancock, Sr. | | |
| 2002/0125723 A1 | 9/2002 | Staalesen | | |
| 2006/0156916 A1 * | 7/2006 | Boisvert | ............... | F15B 7/008 |
| | | | | 91/499 |
| 2006/0210406 A1 * | 9/2006 | Harvey | ............... | F03D 7/02 |
| | | | | 417/334 |
| 2007/0024058 A1 * | 2/2007 | McClintic | ............... | F03D 7/0236 |
| | | | | 290/44 |
| 2007/0169461 A1 * | 7/2007 | Koerner | ............... | C06B 47/02 |
| | | | | 60/39.12 |
| 2008/0302099 A1 * | 12/2008 | Vigholm | ............... | E02F 9/2207 |
| | | | | 60/459 |
| 2010/0056315 A1 * | 3/2010 | Scholte-Wassink | ............... | F03D 1/003 |
| | | | | 475/159 |
| 2010/0320772 A1 * | 12/2010 | Efratyi | ............... | F03D 9/001 |
| | | | | 290/55 |
| 2014/0191624 A1 * | 7/2014 | Jahshan | ............... | H02K 35/02 |
| | | | | 310/68 B |
| 2014/0238022 A1 * | 8/2014 | Damgen | ............... | F02C 6/16 |
| | | | | 60/659 |
| 2015/0219077 A1 * | 8/2015 | Henderson | ............... | F03D 7/04 |
| | | | | 60/459 |

* cited by examiner

CONTROL SYSTEM FOR HYDRAULICALLY POWERED AC GENERATOR

TECHNICAL FIELD

The present disclosure relates generally to the field of generator control. More particularly, the present disclosure relates to systems and methods for controlling provision of hydraulic fluid used to drive a hydraulically powered alternative current (AC) generator.

BACKGROUND

Hydraulically powered AC generators are useful for a variety of applications. Such generators may be used, for example, to drive various components of large vehicles, such as fire trucks. Hydraulically powered AC generators are controlled by regulating an amount of hydraulic fluid used to drive the generators. If the amount of hydraulic fluid used to drive the generator is not controlled accurately, the power output of the generator will vary from a desired power output. This can result in reliability issues for the components powered by the generator.

SUMMARY

One embodiment of the disclosure relates to a valve system for controlling flow of a fluid to a hydraulically powered alternating current (AC) generator. The valve system includes a fixed valve configured to provide a substantially constant flow rate of the fluid through the fixed valve to the hydraulically powered AC generator. The valve system further includes a variable valve configured to provide a variable flow rate of the fluid through the variable valve to the hydraulically powered AC generator. The valve system is configured to output fluid from both the fixed valve and the variable valve to power the hydraulically powered AC generator.

Another embodiment relates to a control system for controlling flow of a fluid to a hydraulically powered alternating current (AC) generator. The control system includes a sensor device configured to measure a speed of movement of a component of the hydraulically powered AC generator. The control system further includes a control circuit configured to generate a control signal based on the speed of movement of the component measured by the sensor device. The control circuit is further configured to transmit the control signal to a control device configured to control a variable flow rate of the fluid output to the hydraulically powered AC generator by a variable valve.

Another embodiment relates to a control system for controlling flow of a fluid to a hydraulically powered alternating current (AC) generator. The control system includes a valve system. The valve system includes a fixed valve configured to provide a substantially constant flow rate of the fluid through the fixed valve to the hydraulically powered AC generator. The valve system further includes a variable valve configured to provide a variable flow rate of the fluid through the variable valve to the hydraulically powered AC generator. The control system further includes a sensor device configured to measure a speed of movement of a component of the hydraulically powered AC generator. The control system further includes a control circuit configured to control the variable flow rate of the variable valve based on the speed of movement of the component measured by the sensor device. In some embodiments, the control circuit is configured to control the variable flow rate of the variable valve to compensate for changes in one or more operating conditions of the hydraulically powered AC generator. In some embodiments, the one or more operating conditions include at least one of a load, a temperature, a pressure, or a pump input speed of the hydraulically powered AC generator.

Another embodiment relates to a hydraulically powered generator system. The system includes a hydraulically powered alternating current (AC) generator configured to generate output power based on flow of a fluid to the hydraulically powered AC generator. The hydraulically powered generator system further includes a valve system. The valve system includes a fixed valve configured to provide a substantially constant flow rate of the fluid through the fixed valve to the hydraulically powered AC generator. The valve system further includes a variable valve configured to provide a variable flow rate of the fluid through the variable valve to the hydraulically powered AC generator. The hydraulically powered generator system further includes a sensor device configured to measure a speed of movement of a component of the hydraulically powered AC generator. The hydraulically powered generator system further includes a control circuit configured to control the variable flow rate of the variable valve based on the speed of movement of the component measured by the sensor device. In some embodiments, the control circuit is configured to control the variable flow rate of the variable valve to compensate for changes in one or more operating conditions of the hydraulically powered AC generator. In some embodiments, the one or more operating conditions include at least one of a load, a temperature, a pressure, or a pump input speed of the hydraulically powered AC generator.

Yet another embodiment relates to a control system for controlling flow of a fluid to a hydraulically powered alternating current (AC) generator. The control system includes a speed measurement module configured to measure a speed of movement of a component of the hydraulically powered AC generator. The control system further includes a control module configured to generate a control signal based on the speed of movement of the component measured by the speed measurement module. The control module is further configured to transmit the control signal to a control device configured to control a variable flow rate of the fluid output to the hydraulically powered AC generator by a variable valve.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Figure 1:
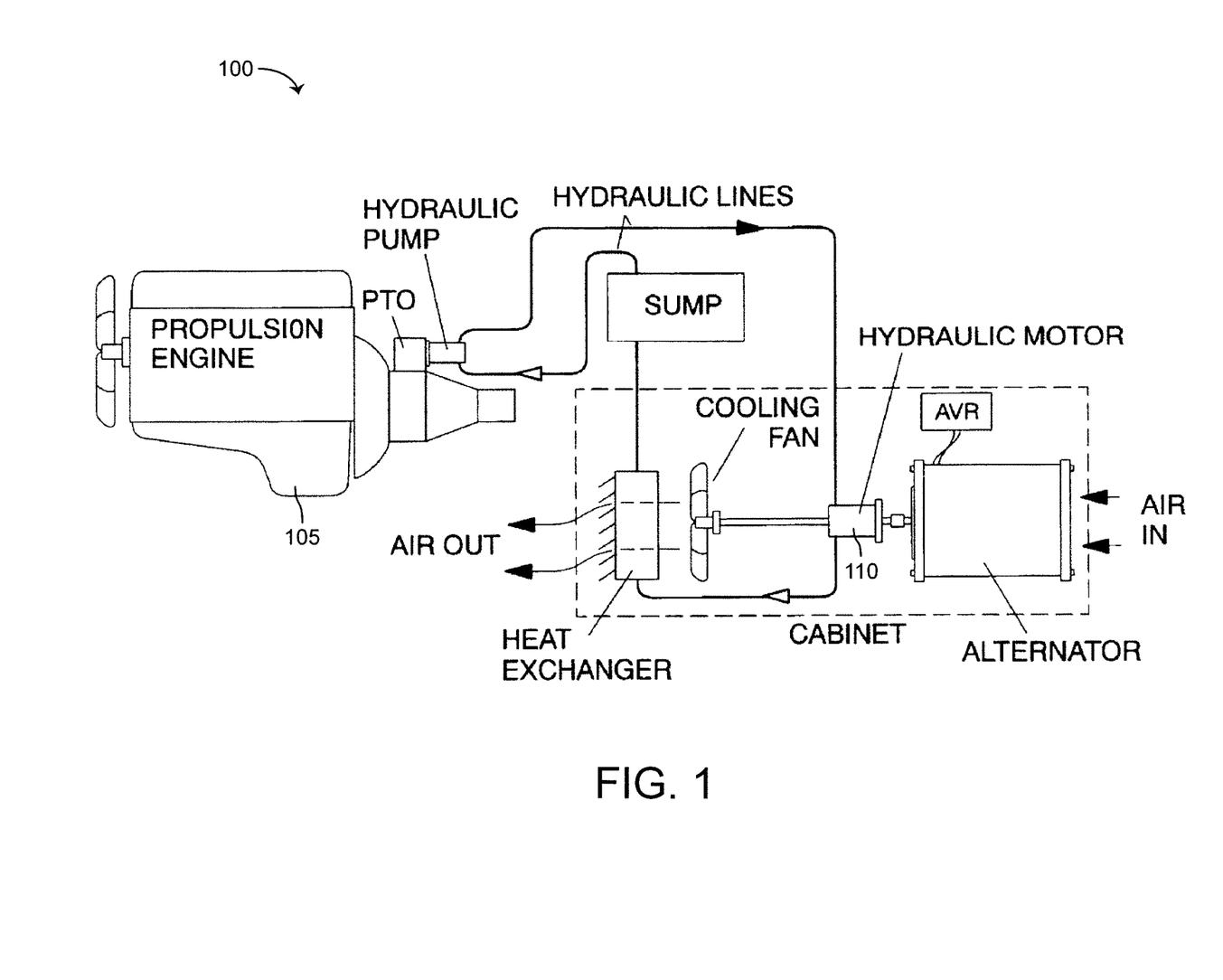
FIG. 1 is a block diagram illustrating a hydraulically powered generator system according to an exemplary embodiment.

Referring generally to the figures, systems and methods that may be used to control the provision of hydraulic fluid to a hydraulically powered generator are provided according to exemplary embodiments. FIG. 1 illustrates a block diagram of one exemplary power system 100 including a hydraulically powered AC generator system. The generator system includes a hydraulic motor 110 that is driven by hydraulic fluid pumped through a fluid loop by a hydraulic pump. The hydraulic pump may be driven by an engine 105, such as an engine used to propel one or more movement components (e.g., wheels, tracks, etc.) of a vehicle. Motor 110 may be used to drive an alternator, which may generate electrical power for use in powering one or more components connected to the generator, such as electrically-driven components of a vehicle. In some embodiments, the generator system shown in FIG. 1 may be, for example, a 6-15 kW hydraulic generator used on rescue (e.g., fire fighting) vehicles.

In some embodiments, the hydraulic fluid may be provided to motor 110 through a single valve or orifice. Using a fixed diameter orifice to provide the fluid to motor 110 may not allow the system to adjust to changing conditions, and may result in an alternator speed that diverges from a target frequency. In some implementations, using a single variable valve to meter the fluid flow rate may result in reduced alternator frequency and/or power output stability, for example, due to insufficient control resolution. For instance, a large valve may be used to bring the system up to nominal flow rate, but the valve may be too large to deliver precise adjustment to correct for small deviations in target speed/frequency.

Some embodiments of the present disclosure may utilize two or more valves to provide hydraulic fluid to a generator system. A first, fixed valve (e.g., having a fixed diameter) may be used to provide a substantially constant flow rate of the fluid through the fixed valve to the generator. A second, variable valve may be used to provide a variable flow rate of the fluid through the variable valve to the generator. In some embodiments, the fluid may be combined at an output of a valve system and transmitted to the motor/generator. In some embodiments, the fixed valve may be configured to provide the majority of the fluid to the generator and allow the system to quickly arrive at nominal flow rate, and the variable valve may allow the system to make more fine adjustments to the flow rate and correct for small deviations in target values (e.g., target speed/frequency).

In some implementations, variable flow rate may be controlled by monitoring an AC output frequency of the generator to determine an alternator speed. Such implementations may be susceptible to load induced feedback and/or interference. For example, variable frequency drive (VFD) devices can induce a feedback through load lines and into the alternator. This feedback may prevent the electronic control circuit from accurately measuring the alternator speed/frequency of the generated power output. Without accurately measuring the alternator speed/frequency, the control circuit may cause adjustments in a variable valve that can cause undesirable changes in the generator output (e.g., changes that move the alternator speed/frequency away from a desired target value). In some instances, this can result in reduced control of alternator speed and/or occasional shutdown of the generator system due to an overspeed and/or underspeed condition. As the use of VFD devices becomes more prevalent in electronic equipment (e.g., equipment in mobile rescue vehicles, such as fire trucks), VFD compatibility will have increased emphasis. It is noted that other loads and forms or profiles of load induced feedback on the load lines and alternator output that can interfere with accurate measurement and control of the alternator are possible (such as sudden load changes or start up of a large electrical load).

Some embodiments of the present disclosure may control the flow of hydraulic fluid to the generator based at least in part on a measured speed of a component (e.g., a physical component) of the generator. In some such embodiments, a sensor device, such as a Hall Effect sensor, optical sensor, or an induction sensor, may be used to measure a speed of movement of a component of the motor and/or alternator. In one implementation, the sensor device may measure a speed of movement of a gear of the generator (e.g., a motor gear) or of the rotor of the generator. It is also noted that various other possible embodiments place the sensor on the hydraulic motor, coupling shaft of the hydraulic generator, or other rotating portion of the generator system. Measuring the speed of movement of a physical component may provide a greater sensing resolution than monitoring an AC output frequency of the generator. Additionally, controlling the flow of hydraulic fluid by measuring the speed of movement of a physical component may reduce or eliminate adverse effects of feedback and/or interference imparted onto the alternator by external electrical loads, such as VFD devices. It is however noted that electronic monitoring of the AC output of the generator for generator control purposes is possible if done with elevated levels of filtering and processing.

Figure 2:
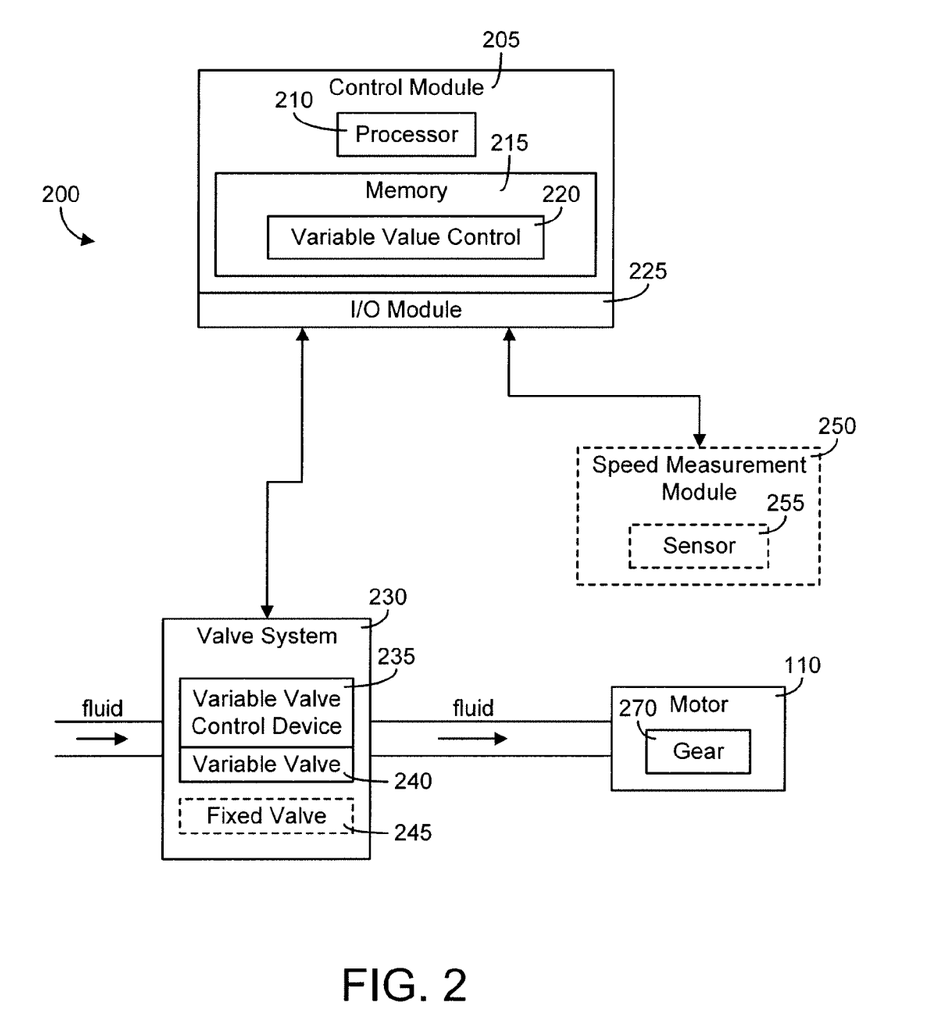
FIG. 2 is a block diagram of a control system for a hydraulically powered generator according to an exemplary embodiment.

Referring now to FIG. 2, a control system 200 that may be used to control a flow of fluid to a hydraulically powered generator, such as the generator shown in FIG. 1, is illustrated according to an exemplary embodiment. System 200 includes a control module 205 (e.g., a control circuit) configured to control flow of fluid through a valve system 230 to motor 110. Control module 205 may include a processor 210, which may be any type of general purpose or special purpose processor (e.g., FPGA, CPLD, ASIC, etc.). Control module 205 may also include a memory 215, which may include any type of computer or machine-readable storage medium (e.g., RAM, ROM, PROM, magnetic storage, optical storage, flash storage, etc.). Control module 205 may include an input/output (I/O) module 225, which may include one or more interfaces that allow control module 205 to communicate with other components.

Control module 205 may include one or more modules configured to implement one or more functions of control module 205. In some embodiments, the modules may be implemented as computer or machine-readable instructions stored in memory 215 that are executable by processor 210 to perform the functions. In some embodiments, the modules may additionally or alternatively be implemented, in whole or in part, via hardware modules (e.g., integrated circuits).

In the illustrated embodiment, control module 205 includes a variable valve control module 220 configured to generate control signals for controlling a variable valve 240 of valve system 230. Module 220 may receive a signal relating to an AC output frequency for an alternator of the generator (e.g., connected to motor 110; not shown in FIG. 2), and may generate the control signals for controlling variable valve 240 based on the received signal. In some embodiments, module 220 may generate the control signals based on input signals received from a speed measurement module 250 configured to measure a movement speed of a physical component of motor 110. In some embodiments, module 220 may additionally or alternatively generate the control signals based on input representative of the AC output frequency of the alternator (e.g., input from a circuit configured to monitor the AC output frequency. For instance, in some such embodiments, signal filtering may be utilized to allow for accurate output frequency determination in the presence of substantial feedback/interference.

Figure 3:
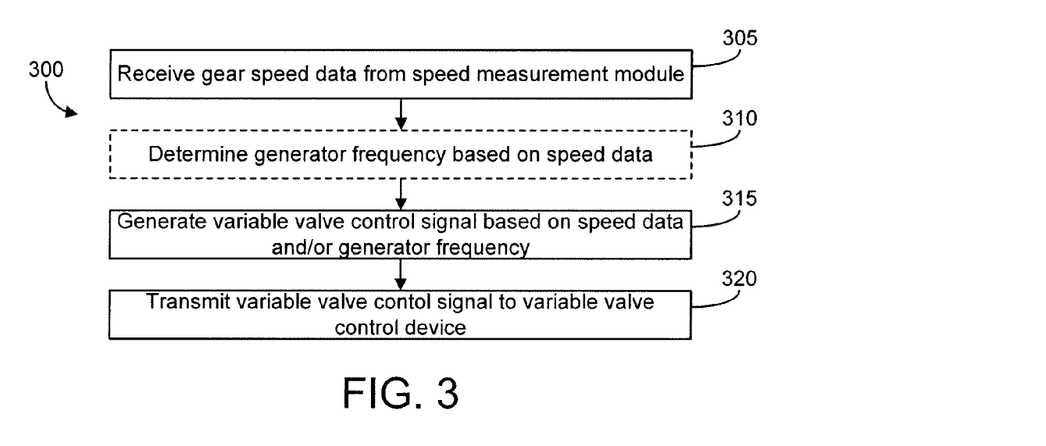
FIG. 3 is a flow diagram of a process for controlling a hydraulically powered generator according to an exemplary embodiment.

FIG. 3 illustrates a flow diagram of a process 300 for controlling fluid flow to a hydraulically powered generator according to an exemplary embodiment. Process 300 may be executed by control module 205 of system 200 (e.g., by variable valve control module 220).

Referring now to both FIGS. 2 and 3, control module 205 may receive an input signal representative of a measured speed of a physical component of the generator from speed measurement module 250 (305). In the illustrated implementation, speed measurement module 250 measures a speed or rotation of a gear 270 of motor 110. In some embodiments, speed measurement module 250 may be configured to monitor teeth of the gear that protrude from a body of the gear. For instance, speed measurement module 250 may detect the teeth as they rotate about an axis. In some embodiments, speed measurement module 250 may determine a speed of rotation of gear based on a number of teeth detected over a determined period of time. Speed measurement module 250 may output a signal representative of the determined speed to control module 205 (e.g., may transmit the signal to I/O module 225). In some embodiments, speed measurement module 250 may output a signal representing detection of the teeth, and control module 205 may determine the speed based on the signal. Monitoring movement of a physical component may provide greater speed/frequency sensing resolution than monitoring the AC output voltage/frequency directly. Segregating the speed sense signal from the AC voltage/frequency of the alternator may allow the system to reduce or eliminate an effect of feedback/interference imparted onto the alternator by external electrical loads, such as VFD devices, particularly where the base technology of the sensor is resistant to or not subject to electromagnetic interference from the operation of the generator. The remaining discussion of FIG. 3 will focus on measurement of movement of gear 270; however, it should be understood that, in various embodiments, any generator component having movement related to a flow of hydraulic fluid and/or the output power (e.g., AC output frequency) of the generator may be monitored instead of, or in addition to, gear 270.

In some embodiments, speed measurement module 250 may be or include a sensor 255 configured to monitor movement of gear 270. In some embodiments, sensor 255 may be a Hall Effect sensor. The Hall Effect sensor may detect movement of gear 270 based on a change in a magnetic field caused by the movement of gear 270 (e.g., a variation in the field caused by the presence and absence of teeth in front of Hall Effect sensor at different times). The Hall Effect sensor may output a signal representative of the variations in the magnetic field over a detection time. For instance, the signal may include peaks in magnetic field intensity when teeth pass in front of the sensor, and troughs when the areas between the teeth are present. Control module 205 may utilize the signal and detection time to determine the speed of rotation of gear 270.

In some embodiments, system 200 may additionally or alternatively utilize other types of sensors to measure speed of rotation of gear 270. For instance, sensor 255 may be, or include, an optical encoder sensor. The optical encoder sensor may include a light source configured to generate light (e.g., light having a predetermined intensity). The optical encoder sensor may also include a light detection device (e.g., a photosensor) configured to generate a signal representative of detected changes in the light reflected off of the gear as the gear moves. Because the variations in the light reflected off of corresponding portions of the gear (e.g., teeth and portions between teeth) should be relatively similar, the generated signal should have a substantially periodic characteristic, and control module 205 may determine portions representative of the teeth in the signal and calculate the speed of rotation of gear 270 in a similar fashion as described above.

In some embodiments, sensor 255 may be, or include, a magnetic pickup sensor. The magnetic pickup sensor may function in a manner similar to a Hall Effect sensor, but may sense a magnetic object passing by the sensor (the Hall Effect sensor may sense a Ferrous object that is or is not magnetized). In such an embodiment, a magnetic element may be incorporated within or coupled to the physical component of the generator (e.g., a rotating assembly), and movement of the magnetic element (e.g., movement past a predetermined position) may be detected by the magnetic pickup sensor.

In some embodiments, control module 205 may determine a generator output frequency (e.g., AC output frequency) based on the speed data (310). In some such embodiments, control module 205 may utilize one or more processing equations to calculate an output frequency corresponding to the speed data. For instance, in the illustrated implementation, the output frequency is directly proportional to the speed of movement of gear 270, and control module 205 may calculate/estimate the output frequency based on the measured speed. In some implementations, control module 205 may utilize a lookup table or other data structure that cross-correlates measured speed to estimated output frequency. Data filtering or averaging may also be utilized to smooth the measurements and transitions, and to remove outliers.

Module 205 may generate variable valve control signals based on the speed data and/or generator frequency (315). The generated control signals may be configured to cause a desired hydraulic flow rate through valve system 230, which in turn may be configured to cause a desired AC output frequency of the generator. In some embodiments, module 205 may estimate a current output frequency based on the speed determined from the input from speed measurement module 250, may calculate a difference between the current output frequency and a desired output frequency, and may generate a control signal configured to cause variable valve 240 to increase or decrease the hydraulic fluid flow rate to achieve the desired output frequency. In some embodiments, module 205 may generate the control signal utilizing the speed signal without calculating the current output frequency as an intermediate step.

Module 205 may transmit the control signal to a variable valve control device 235 (320). In some embodiments, variable valve control device 235 may be configured to control movement of a plate or other component of variable valve 240. Variable valve control device 235 may be configured to control the amount (e.g., percentage) of opening of variable valve 240 (e.g., control the diameter). For instance, variable valve control device 235 may be configured to receive an electrical control signal from control module 205 and effect physical movement of the plate based on the control signal. In some embodiments, control module 205 may be integrated with or coupled to valve system 230, and may itself serve as variable valve control device 235.

Referring again to FIG. 2, in some embodiments, system 200 may utilize a multiple-valve valve system 230 including both variable valve 240 and a fixed valve 245. Fixed valve 245 may provide a substantially constant flow rate through a fixed-diameter orifice, and variable valve 240 may provide a variable flow rate through an orifice having a variable diameter that may be controlled via control signals received from control module 205. In some embodiments, fixed valve 245 may have a larger diameter and may be configured to enable valve system 230 to increase flow quickly to a nominal flow rate (e.g., upon a startup or restart condition), and variable valve 240 may provide for fine control of the hydraulic fluid flow rate through motor 110. In such embodiments, the fluid flow may be divided through two parallel paths to accomplish precise control of fluid flow rate. In some embodiments, the primary flow path through fixed valve 245 may provide a majority (e.g., approximately seventy percent or more) of the nominal flow rate to motor 110, and the secondary flow path through variable valve 240 may provide the remaining flow rate (e.g., approximately thirty percent or less). By separating bulk flow from variable flow, system 200 may be able to apply more precise control of hydraulic flow rate, which may result in increased generator stability (e.g., increased stability of power output from the alternator).

In some embodiments, system 200 may utilize more than two valves (e.g., multiple fixed valves and/or multiple variable valves). In some such embodiments, control module 205 may be configured to control which fixed valves are open/closed and/or an opening level of variable valves based on generator operating conditions, generator demand, current flow conditions (e.g., based on input from speed measurement module 250), etc. In one such embodiment, control module 205 may be configured to independently control a first variable valve to provide a first flow rate and a second variable valve to provide a second flow rate.

In some embodiments, variable valve 240 may be a continuously variable proportional valve or a variable proportional valve utilizing a series of discrete steps of fixed or predetermined flow change. In some embodiments, control module 205 may be configured to adjust variable valve 240 to compensate for changes in one or more generator operating conditions, such as load, temperature, pressure, and/or pump input speed. In some embodiments, changes in these conditions may be directly measured using one or more sensors or other devices. In some embodiments, changes in these conditions may be detected or inferred through input from speed measurement module 250, input representative of an AC output frequency of the alternator, and/or other types of input.

Some embodiments of the present disclosure utilize a multiple-valve system including a variable valve and a fixed valve, and do not utilize a speed measurement module/sensor configured to measure movement of a physical component. In some such embodiments, control of the variable valve may be based on measurement of the AC output frequency of the alternator. Other embodiments utilize a speed measurement module/sensor configured to measure movement of a physical component, and utilize a single-valve system (e.g., a single variable valve). Other embodiments utilize both a multiple-valve system including a variable valve and a fixed valve and a speed measurement module/sensor configured to measure movement of a physical component. All such embodiments are contemplated within the scope of the present disclosure.

Figure 4:
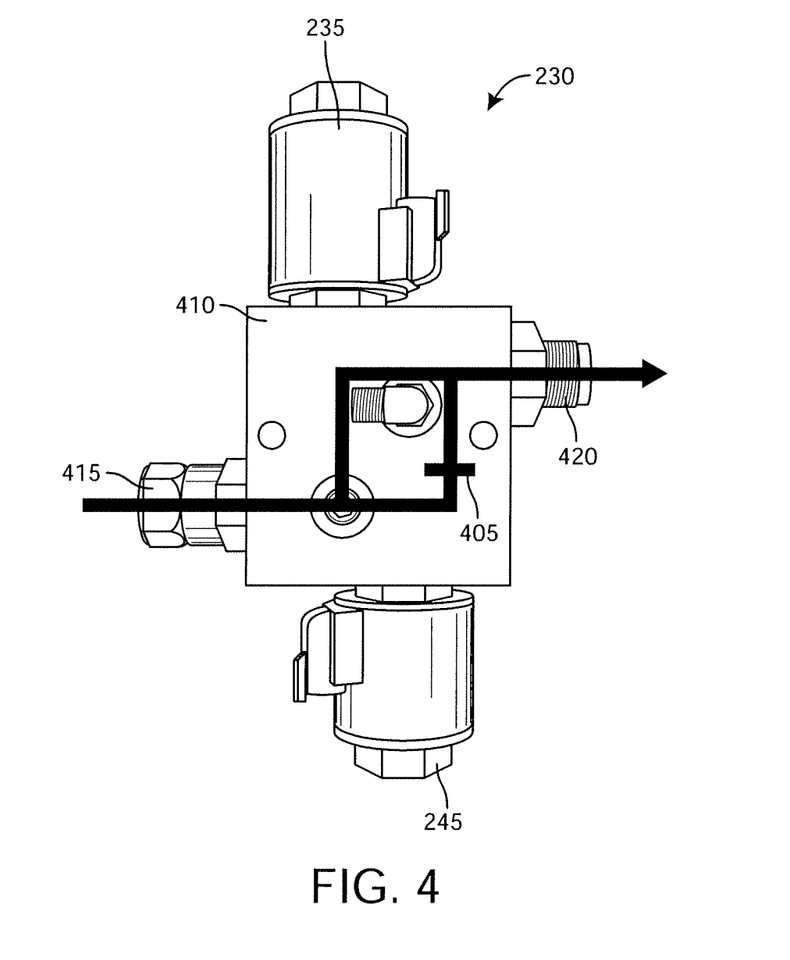
FIG. 4 is an illustration of a valve system according to an exemplary embodiment.

FIG. 4 illustrates valve system 230 according to one exemplary embodiment. In the illustrated embodiment, valve system 230 includes a valve body 410 through which hydraulic fluid flows and is metered by a fixed valve 245 and variable valve 240. Fixed valve 245 includes a fixed orifice 405 that provide a substantially constant flow rate through one of the parallel paths through valve system 230. Hydraulic fluid is received through an input 415 of valve system 230, is metered by variable valve 240 and fixed valve 245, and is sent forward through the motor through an output 420.

Figure 5:
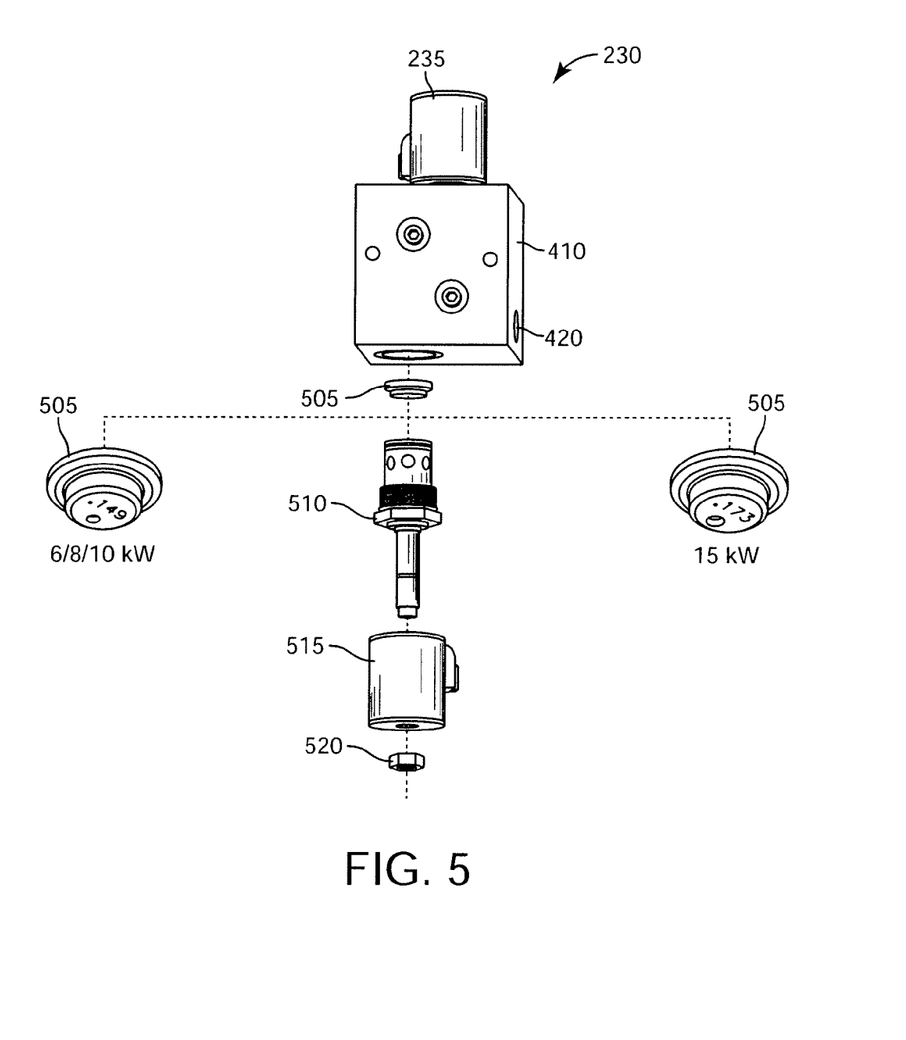
FIG. 5 is an another illustration of the valve system of FIG. 4.

FIG. 5 is another illustration of valve system 230 illustrating some further detail of the components of fixed valve 245, according to one embodiment. The fixed valve 245 includes a housing 515, a body 510, an orifice 505, and a fastener 520 (e.g., a nut) to fasten the components together. Different types of orifice 505 may be utilized for different applications (e.g., different types of generators). For instance, in the illustrated implementation, a first, smaller orifice may be utilized for a generator having a smaller rated output (e.g., six, eight, ten, etc. kW), and a second, larger orifice may be utilized for a generator having a larger rated output (e.g., 15 kW). In the illustrated embodiment, orifice 505 is a removable orifice. Utilizing a removable orifice may allow valve system 230 to be reused in different types of generators. In some implementations, orifice 505 may be integrated with body 510, and may not be removable. Utilizing a fixed orifice may prevent against errors such as valve system 230 being assembled without an orifice, using an incorrect orifice for an application, misplacing a removed orifice, etc.

Figure 6:
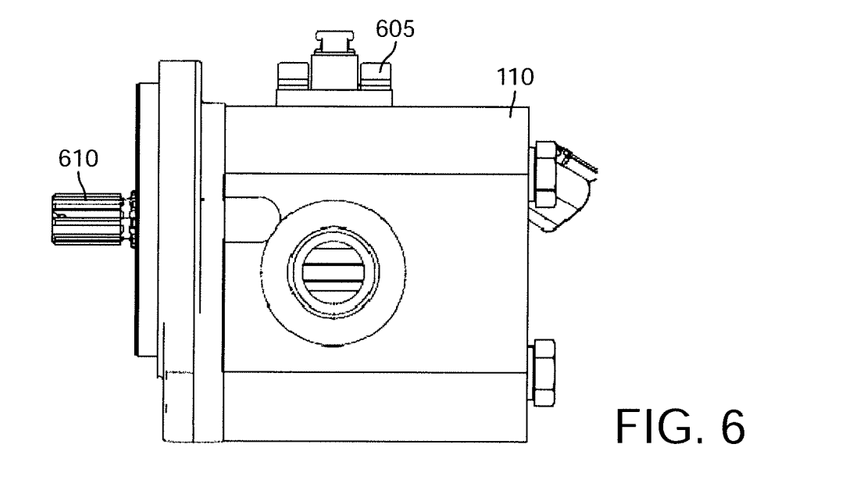
FIG. 6 is a side view of a motor including a speed measurement device according to an exemplary embodiment.

FIG. 6 is a side view of motor 110 including a speed measurement device according to an exemplary embodiment. In the illustrated embodiment, motor 110 includes an output shaft 610 configured to rotate in proportion to a flow of hydraulic fluid through motor 110. In this embodiment, a speed of rotation of a gear of motor 110 is monitored through the use of a Hall Effect sensor 605. It is noted that placement of the sensor in the motor 110 aids in further isolating the sensor from any electromagnetic interference from the generator.

Figure 7:
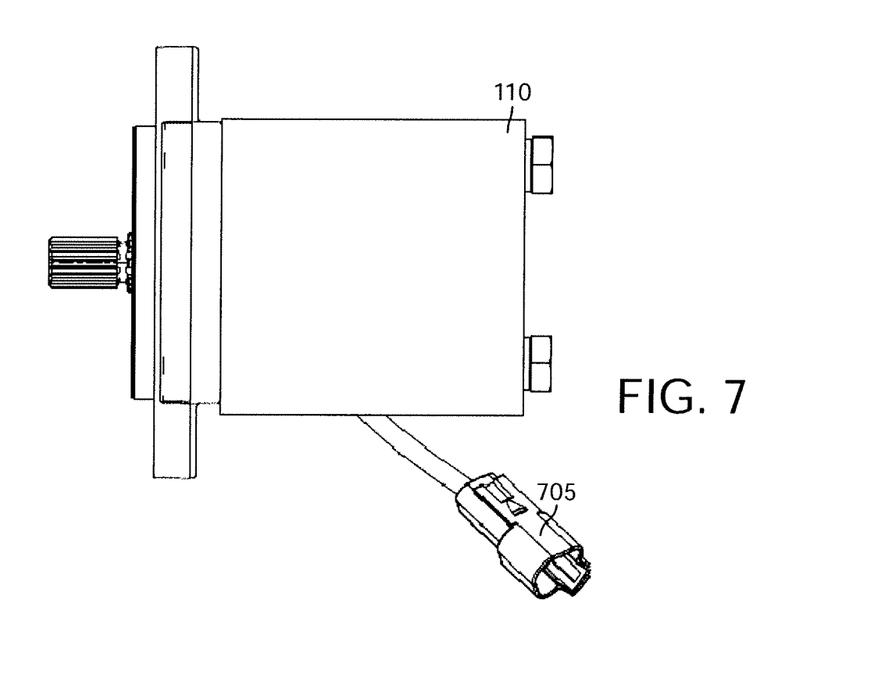
FIG. 7 is another side view of the motor of FIG. 6.

FIG. 7 is another side view of the motor 110 illustrated in FIG. 6. FIG. 7 shows an electrical cable 705 configured to transmit signals to and/or from motor 110 and/or Hall Effect sensor 605. In some implementations, cable 705 may be connected to a control module such as control module 205. In some such implementations, a speed sensing signal generated by Hall Effect sensor 605 may be transmitted to the control module via cable 705.

Figure 8:
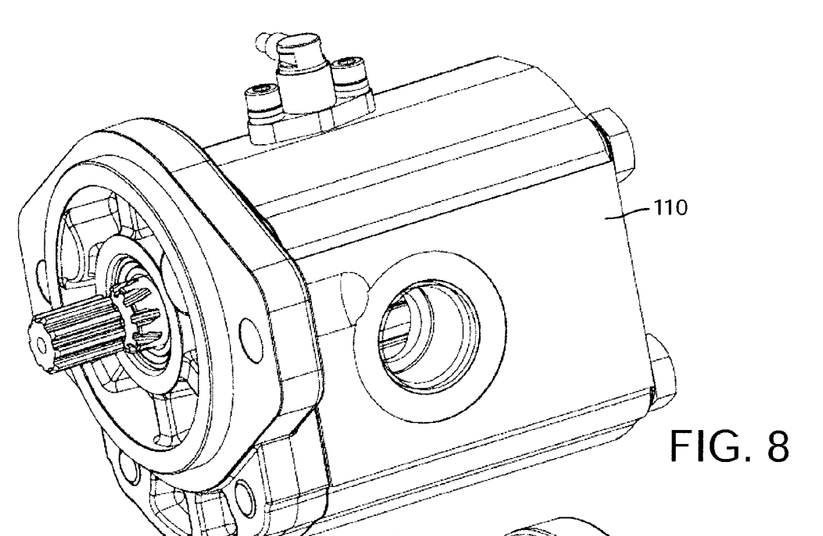
FIG. 8 is a perspective view of the motor of FIG. 6.
Figure 9:
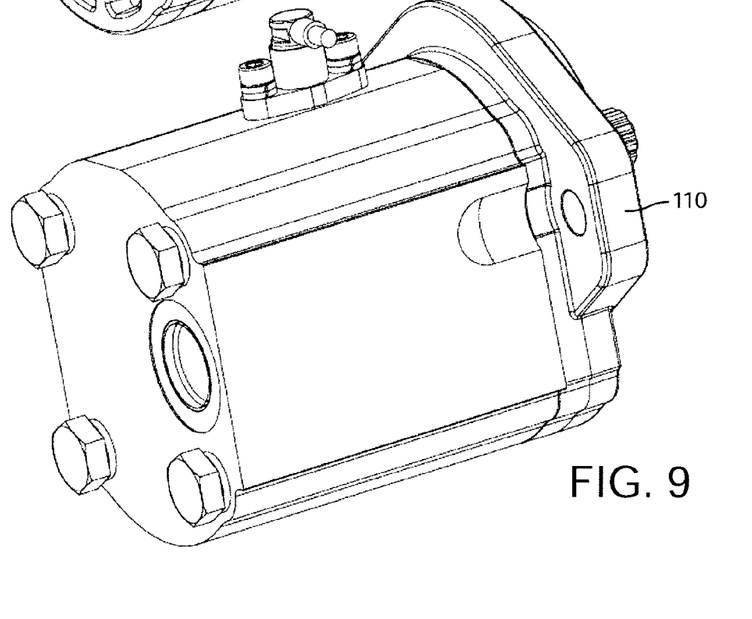
FIG. 9 is another perspective view of the motor of FIG. 6.

FIGS. 8 and 9 illustrate additional perspective views of motor 110.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media that can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., signals in space).

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A valve system for controlling flow of a fluid to a hydraulically powered alternating current (AC) generator, the valve system comprising:
   a first flow path comprising a fixed valve configured to provide a substantially constant flow rate of the fluid through the fixed valve to a common fluid output to reach the hydraulically powered AC generator; and
   a second flow path comprising a variable valve configured to provide a variable flow rate of the fluid through the variable valve to the common fluid output to reach the hydraulically powered AC generator;
   wherein a flow rate of the fluid output from the common fluid output to drive the hydraulically powered AC generator includes a sum of the substantially constant flow rate of the fluid and the variable flow rate of the fluid, and wherein the variable valve provides control of a portion of the fluid output from the common fluid output to control an electrical output of the hydraulically powered AC generator.

2. The valve system of claim 1, further comprising a control device configured to control the variable flow rate of the variable valve to compensate for changes in one or more operating conditions of the hydraulically powered AC generator.

3. The valve system of claim 2, wherein the one or more operating conditions comprise at least one of a load, a temperature, a pressure, or a pump input speed of the hydraulically powered AC generator.

4. The valve system of claim 2, wherein the control device is configured to control the variable flow rate based on input received from a control circuit, the input based on a speed of movement of a component of the hydraulically powered AC generator detected using a sensor device.

5. The valve system of claim 4, wherein the input is based on the speed of movement of one of a gear, a hydraulic motor, a shaft, and a rotor of the hydraulically powered AC generator.

6. The valve system of claim 1, wherein the variable valve comprises a first variable valve, wherein the variable flow rate comprises a first variable flow rate, and the valve system further comprises a second variable valve, the first variable valve and the second variable valve independently controllable to provide the first variable flow rate and a second variable flow rate, respectively.

7. A control system for controlling flow of a fluid to a hydraulically powered alternating current (AC) generator, the control system comprising:
   a sensor device configured to measure a speed of movement of a component of the hydraulically powered AC generator; and
   a control circuit configured to generate a control signal based on the speed of movement of the component measured by the sensor device, wherein the control circuit is further configured to transmit the control signal to a control device configured to control a variable flow rate of the fluid output to the hydraulically powered AC generator by a variable valve, wherein the variable valve is paralleled with a fixed valve for the fluid to reach the hydraulically powered AC generator, wherein the fixed valve provides a substantially constant flow rate of the fluid output to the hydraulically powered AC generator, wherein a flow rate of the fluid to drive the hydraulically powered AC generator includes a sum of the substantially constant flow rate of the fluid and the variable flow rate of the fluid, and wherein the variable valve provides control of a portion of the fluid output from the common fluid output to control an electrical output of the hydraulically powered AC generator.

8. The control system of claim 7, wherein the sensor device is configured to measure a speed of movement of one of a gear and a rotor of the hydraulically powered AC generator.

9. The control system of claim 8, wherein the sensor device comprises a Hall Effect sensor configured to measure a change in a magnetic field caused by the movement of the gear or the rotor.

10. The control system of claim 8, wherein the sensor device comprises an optical encoder sensor, the optical encoder sensor comprising a light source configured to generate light and a light detection device configured to detect changes in the light reflected off of the gear or rotor as the gear or rotor moves.

11. The control system of claim 8, wherein the sensor device comprises a magnetic pickup sensor.

12. The control system of claim 7, wherein the control circuit is configured to generate the control signal based on both the speed of movement of the component measured by the sensor device and an AC output frequency of the hydraulically powered AC generator measured using a second sensor device.

13. The control system of claim 7, wherein the control circuit is configured to generate the control signal to maintain an AC output frequency of the hydraulically powered AC generator within a threshold range of a target AC output frequency.

14. A hydraulically powered generator system comprising:
   a hydraulically powered alternating current (AC) generator configured to generate output power based on flow of a fluid to the hydraulically powered AC generator;
   a valve system comprising:
      a first flow path comprising a fixed valve configured to provide a substantially constant flow rate of the fluid through the fixed valve to a common fluid output to reach the hydraulically powered AC generator; and
      a second flow path comprising a variable valve configured to provide a variable flow rate of the fluid through the variable valve to the common fluid output to reach the hydraulically powered AC generator;
      wherein a flow rate of the fluid output from the common fluid output to drive the hydraulically powered AC generator includes a sum of the substantially constant flow rate of the fluid and the variable flow rate of the fluid, and wherein the variable valve provides control of a portion of the fluid output from the common fluid output to control an electrical output of the hydraulically powered AC generator,
   a sensor device configured to measure a speed of movement of a component of the hydraulically powered AC generator; and
   a control circuit configured to control the variable flow rate of the variable valve based on the speed of movement of the component measured by the sensor device to compensate for changes in one or more operating conditions of the hydraulically powered AC generator, wherein the one or more operating conditions comprise at least one of a load, a temperature, a pressure, or a pump input speed of the hydraulically powered AC generator.

15. The control system of claim 14, wherein the sensor device is configured to measure a speed of movement of one or more of a gear and a rotor of the hydraulically powered AC generator.

16. The control system of claim 15, wherein the sensor device comprises at least one of a Hall Effect sensor, an optical encoder sensor, or a magnetic pickup sensor.

17. The control system of claim 14, wherein the control circuit is configured to generate the control signal based on both the speed of movement of the component measured by the sensor device and an AC output frequency of the hydraulically powered AC generator measured using a second sensor device.

18. The control system of claim 14, wherein the control circuit is configured to generate the control signal to maintain an AC output frequency of the hydraulically powered AC generator within a threshold range of a target AC output frequency.

19. The control system of claim 14, wherein the variable valve comprises a first variable valve and the variable flow rate comprises a first variable flow rate, wherein the valve system further comprises a second variable valve configured to provide a second variable flow rate, and wherein the control circuit is configured to independently control the first variable valve and the second variable valve to provide the first variable flow rate and the second variable flow rate, respectively.

20. A control system for controlling flow of a fluid to a hydraulically powered alternating current (AC) generator, the control system comprising:
 a speed measurement module configured to measure a speed of movement of a component of the hydraulically powered AC generator; and
 a control module configured to generate a control signal based on the speed of movement of the component measured by the speed measurement module, wherein the control module is further configured to transmit the control signal to a control device configured to control a variable flow rate of the fluid output to the hydraulically powered AC generator by a variable valve, wherein the variable valve is paralleled with a fixed valve for the fluid to reach the hydraulically powered AC generator, wherein the fixed valve provides a substantially constant flow rate of the fluid output to the hydraulically powered AC generator, wherein a flow rate of the fluid to drive the hydraulically powered AC generator includes a sum of the substantially constant flow rate of the fluid and the variable flow rate of the fluid, and wherein the variable valve provides control of a portion of the fluid output from the common fluid output to control an electrical output of the hydraulically powered AC generator.

21. The control system of claim 20, wherein the speed measurement module is configured to measure a speed of movement of at least one of a gear and a rotor of the hydraulically powered AC generator.

22. The control system of claim 21, wherein the speed measurement module comprises at least one of a Hall Effect sensor, an optical encoder sensor, or a magnetic pickup sensor.

23. The control system of claim 20, wherein the control module is configured to generate the control signal based on both the speed of movement of the component measured by the speed measurement module and an AC output frequency of the hydraulically powered AC generator measured using a frequency measurement module.

24. The control system of claim 20, wherein the control module is configured to generate the control signal to maintain an AC output frequency of the hydraulically powered AC generator within a threshold range of a target AC output frequency.

25. The valve system of claim 1, wherein the first flow path and the second flow path are parallel flow paths for the fluid to reach the hydraulically powered AC generator.

26. The valve system of claim 14, wherein the first flow path and the second flow path are parallel flow paths for the fluid to reach the hydraulically powered AC generator.

* * * * *